United States Patent Office 3,629,344
Patented Dec. 21, 1971

3,629,344
OXIDATIVE DEMETHYLATION OF METHYL GROUPS ORTHO TO A STRONGLY ELECTRONEGATIVE GROUP ON AN AROMATIC RING
Leo R. Morris, Midland, Mich., assignor to The Dow Chemical Company, Midland, Mich.
No Drawing. Filed Oct. 17, 1968, Ser. No. 768,491
Int. Cl. C07c 79/10, 79/12, 121/52
U.S. Cl. 260—645                                         7 Claims

ABSTRACT OF THE DISCLOSURE

Methyl groups ortho to a strongly electronegative group on an aromatic ring are removed by reacting the substituted aromatic compound with a strong base dissolved in a secondary or tertiary alcohol in the presence of oxygen.

BACKGROUND OF THE INVENTION

Bergstrom et al. in J. Org. Chem., 7, 98 (1942) have shown a dimerization reaction for o-nitrotoluene in basic solution using oxygen.

Russell et al, in J. Org. Chem., 32, 137 (1967) have studied the reactions of p-nitrotoluene and its derivatives with molecular oxygen in t-butyl alcohol containing potassium t-butoxide. The products of these reactions were primarily the dimer and the p-nitrobenzoic acid.

A number of methods of demethylation are known. These methods generally use a number of steps having different oxidation intermediates and employ strenuous reaction conditions involving temperatures greater than 200° C.

It is an object of the present invention to selectively remove methyl groups which are ortho to a strongly electronegative group by a one-step demethylation. It is an additional object of this invention to remove methyl groups without employing strenuous reaction conditions. It is a further object of the present invention to remove methyl groups ortho to a strongly electronegative group without affecting other aliphatic substituents on the aromatic ring.

SUMMARY OF THE INVENTION

Methyl groups which are otho to a strongly electronegative substituent on an aromatic ring are removed by reacting the substituted aromatic compound with a strong base dissolved in a secondary or tertiary alcohol in the presence of oxygen. The process of the present invention involves essentially a liquid phase oxygenation of the methyl group.

By employing mild reaction conditions and atmospheric pressure, only a few hours are required for almost complete conversion. The by-product of the present invention is the corresponding benzoic acid which may be useful for further reaction, such as decarboxylation.

The subject of the invention is a substituted aromatic compound which contains a methyl group in the ortho position to a strongly electronegative group. The strongly electronegative group is not affected by the reaction and may suitably include radicals which strongly withdraw electrons from the benzene ring, such as nitro, cyano, trifluoromethyl, aroyl, nitrophenyl, and other inert strongly electronegative groups. Specific examples of suitable electronegative groups include trifluoromethyl, benzoyl, nitrophenyl, nitro, cyano, and similar radicals exhibiting the electron withdrawing properties of these substituents.

The substituted aromatic compounds used in the process of this invention may also contain one or more aliphatic hydrocarbon radicals having one to six carbon atoms or more. These radicals are substituted on the unoccupied positions of the aromatic ring. Such hydrocarbon substituents may include alkyl and alkenyl groups, such as methyl, ethyl, propyl, isopropyl, isopropenyl, butyl, tert.-butyl, pentyl, and hexyl groups.

Combining the elements used to describe the substituted aromatic compound to be demethylated in the present invention, the reactants used may suitably include o-nitrotoluene, 2-nitro-p-cymene, α,4-dimethyl-3-nitrostyrene, 4 - tert.-butyl - 2 - nitrotoluene, 4 - hexyl-2-nitrotoluene, 3 - ethyl - o - trifluoromethyltoluene, o-cyanotoluene, o - methylbenzophenone, 2 - methyl-6-isopropyl - 2' - nitrodiphenyl, 3,5 - diisopropyl - 2 - nitrotoluene, 1 - nitro - 2 - methylnaphthalene and other combinations of the strongly electronegative groups and the additional aliphatic groups.

The substituted aromatic compound used in the process of the invention is reacted with a strong base in an alcoholic solution. The base of the invention may suitably include an alkali metal hydroxide or an alkali metal alkoxide containing 1 to 4 carbon atoms. Thus, the strong bases which may be suitably used in the process of the invention include sodium hydroxide, potassium hydroxide, sodium methoxide, sodium ethoxide, sodium isopropoxide, potassium propoxide and potassium tertiary butoxide. Of these bases, potassium hydroxide and sodium methoxide are preferred.

The molar ratio of the strong base to the aromatic compound used in the present invention is not a critical factor. The comparative concentrations of these two reactants may vary widely, but equal molar amounts are preferred. When less than an equal molar amount of the strong base is used, the substituted aromatic ring is not completely converted. On the other hand, an excess of strong base may be used, but molar excesses of base to aromatic compound greater than 2 give decreasing yields as more base is added.

The alcoholic media in the process of the present invention should be essentially anhydrous. A small amount of water or other substance may be present, but concentrations greater than 5% result in significantly lesser yields. The alcohol used in the process of the present invention may suitably be an alkyl or a phenylalkyl secondary or tertiary alcohol containing 3 to 10 or more carbon atoms. Acceptable examples include isopropyl alcohol, sec.-butyl alcohol, tert.-butyl alcohol, tert.-amyl alcohol, 2-phenyl-2-propanol and 2-phenyl - 2 - butanol. Tertiary alcohols are preferred, with the best results being obtained from tert.-butyl alcohol.

During the course of the reaction oxygen must be present. To assure sufficient contact, the oxygen may be introduced into the reaction mixture to promote the oxidation. This may be done in any convenient manner, for example, sparging the oxygen under the surface of the liquid reaction mixture. Pure oxygen is preferred, but air or another oxygen-containing gas may be used.

The temperatures used in the process of the invention are dependent on the reactants and the media used for the specific demethylation. As the reactants and conditions are altered, the temperature may be adjusted to the optimum range by a few test runs. For example, the optimum range for the oxygenation of 2-nitro-p-cymene appears to be 25° to 50° C. The reaction temperature is not crucial to the success of the reaction, but temperatures within the range of 10° to 100° C. are suitable. When an additional aliphatic substituent is present on the aromatic compound, however, the reaction temperature should not be so severe that this organic group is affected.

The time of the reaction in the present invention is dependent upon the other reaction conditions. For a reaction run under the optimum temperature conditions, a time of 1 to 20 hours or more is generally sufficient.

For essentially complete conversion, using optimum conditions, however, the reaction may require several hours.

The pressure used in the process of the invention is not critical. It is convenient to use atmospheric pressure but higher or lower pressures are acceptable. Higher oxygen pressures naturally accelerate the reaction.

SPECIFIC EMBODIMENTS

Example 1

A mixture of 14.4 grams (0.077 mole) of 2-nitro-p-cymene (containing 6% 3-nitro isomer), 9.0 grams (0.16 mole) of powdered potassium hydroxide, and 80 ml. of tert.-butyl alcohol was stirred and heated to 50° C. while a stream of pure oxygen gas was introduced under the surface of the reaction mixture. The reaction was continued for 4 hours while portions of the solution were checked periodically by gas-liquid chromatography. After four hours, the solution was cooled and diluted with 250 ml. of water. The organic layer was then extracted with several portions of carbon tetrachloride. The carbon tetrachloride extract was washed with water, dried with anhydrous sodium sulfate and concentrated under vacuum to remove most of the solvent. A dark colored residue amounting to 10.0 grams composed of 5 grams of converted product and 5 grams of solvent was recovered. Upon analysis the converted product was found to contain 62% m-nitrocumene, 18% 3-nitro-p-cymene, 18% 2-nitro-p-cymene, and about 2% of a higher boiling carbonyl-containing component. These results were based on gas-liquid chromatography and infrared spectroscopy.

Acidification of the aqueous phase with hydrochloric acid and extraction with methylene chloride gave a solution of the acid produced by the reaction. The extraction, concentrated and dried in vacuo, gave 5.7 grams of a semi-solid residue. Analysis of this product by infrared spectroscopy indicated that the product was predominantly 4-isopropyl-2-nitrobenzoic acid. Recrystallization of a sample of the crude acid from methanol gave a tan solid melting at 95.5° to 98.5° C.

Example 2

By the process of Example 1, 18.0 grams of 2-nitro-p-cymene were reacted. The carbon tetrachloride extraction was omitted and the total reaction product was acidified. Methylene chloride was used to extract the organic reaction products and after removal of the solvent, 19.8 grams were obtained. This reaction product was distilled to 120° C. in vacuo to give 7.2 grams (76°–120°/0.5 mm.). The distillate was found by gas-liquid chromatography to be 70% m-nitrocumene, 15% 3-nitro-p-cymene, and 15% 2-nitro-p-cymene. To the residue in the distillation flask 0.2 grams of cuprous oxide was added and the distillation was continued to a temperature of 270° C. 3.4 grams of 99% pure m-nitrocumene was collected giving a total conversion of 51% (yield of 67%) of this product. A polymeric residue of 5.3 grams remained.

By the techniques shown in Examples 1 and 2, o-methyl-benzophenone, 2-methyl-6 - isopropyl-2'-nitrodiphenyl, o-trifluoromethyltoluene, 3,5-diisopropyl-2-nitrotoluene and other compounds are reacted with an alcoholic solution of a strong base in the presence of oxygen.

When the process of the invention is conducted under optimum conditions, almost complete conversion of the starting aromatic compound is possible. Of the total reactant converted, up to 80% of it may be converted to the desired demethylated product, up to 50% may be the corresponding benzoic acid, and up to 30% may be unidentified products. A typical yield from the reaction of 2-nitro-p-cymene with potassium hydroxide and oxygen in tert.-butyl alcohol would be 57% m-nitrocumene, 30% 4-isopropyl-2-nitrobenzoic acid and 13% unidentified products.

I claim:
1. The process for demethylating an aromatic compound which has a methyl group ortho to a strongly electronegative substituent selected from the group consisting of nitro, cyano, trifluoromethyl, aroyl and nitrophenyl comprising reacting by contacting at reaction temperature the substituted aromatic ring with a strong base dissolved in a secondary or tertiary alcohol in the presence of oxygen.
2. The process defined in claim 1 wherein the substituted aromatic compound contains one or more aliphatic hydrocarbon radicals having 1 to 6 carbon atoms in addition to the strongly electronegative group and the ortho methyl group.
3. The process defined in claim 1 wherein the strong base is an alkali metal hydroxide or alkoxide containing up to 4 carbon atoms.
4. The process defined in claim 1 wherein the alcoholic medium is an essentially anhydrous solution of a tertiary alkanol or phenylalkanol containing up to 10 carbon atoms.
5. The process defined in claim 1 wherein the temperature is 10° to 100° C.
6. The process defined in claim 1 wherein potassium hydroxide in essentially anhydrous tert.-butyl alcohol is reacted with the substituted aromatic ring.
7. The process defined in claim 1 wherein the electronegative substituent is the nitro group.

References Cited

Pavlath et al.: Aromatic Flourine Compounds, Reinhold Pub. Corp., New York, 1962, p. 52.

LELAND A. SEBASTIAN, Primary Examiner

U.S. Cl. X.R.

260—465 R, 590, 646, 687